US005114126A

United States Patent [19]

Yasue

[11] Patent Number: 5,114,126

[45] Date of Patent: May 19, 1992

[54] METAL WORKING VISE

[75] Inventor: Tsutomu Yasue, Kanazawa, Japan

[73] Assignee: Tsudakoma Kogyo Kabushiki Kaisha, Japan

[21] Appl. No.: 645,054

[22] Filed: Jan. 24, 1991

[30] Foreign Application Priority Data

Jan. 29, 1990 [JP] Japan ........................ 2-19695

[51] Int. Cl.[5] ........................ B23Q 3/08

[52] U.S. Cl. ........................ 269/32; 269/136

[58] Field of Search ........................ 269/25, 32, 28, 27, 269/224, 226, 329 R, 136; 92/146, 128, 130; 91/390; 60/547

[56] References Cited

U.S. PATENT DOCUMENTS

| | | | |
|---|---|---|---|
| 3,603,579 | 9/1971 | Odom | 269/28 |
| 4,664,364 | 5/1987 | Lymburner | 269/329 |
| 4,949,943 | 8/1990 | Bernstein | 269/136 |
| 4,973,033 | 11/1990 | Sun | 269/32 |

FOREIGN PATENT DOCUMENTS

| | | | |
|---|---|---|---|
| 2916179 | 10/1980 | Fed. Rep. of Germany | 269/32 |

*Primary Examiner*—Robert C. Watson

*Attorney, Agent, or Firm*—Lerner, David, Littenberg, Krumholz & Mentlik

[57] ABSTRACT

In construction of a metalworking vise having a fixed base, a stationary jaw mounted atop the front end portion of the fixed base, a slide jaw arranged facing the stationary jaw, and a piston movable into a hydraulic chamber to raise its fluid pressure, a holder shaft provided at its front end with an axial extension defining the hydraulic chambers and a force magnifying mechanism is arranged in the fixed base near the stationary jaw. The specified location of the force magnifying mechanism allow generation of a large clamp force at high precision in clamping position without causing any substantial warping of the fixed base.

15 Claims, 8 Drawing Sheets

METAL WORKING VISE

BACKGROUND OF THE INVENTION

The present invention relates to an improved metalworking vise, and more particularly relates to improvement in construction of a clamp force amplifying mechanism used for a metalworking vise.

In general construction of a metalworking vise, a stationary jaw is amounted to a fixed base arranged on a work table of a machine, a horizontal screw drive shaft is axially rotatablly mounted to the fixed base and a slide jaw mounted to the screw drive shaft via an integral nut is arranged facing the fixed jaw. On rotation of the screw drive shaft, the slide jaw is driven for movement towards the stationary jaw in order to clamp a workpiece in between.

In this specification words "front" and "forward" are used in connection with the stationary jaw side whereas words "rear" and "rearwards" are used in connection with the slide jaw side.

Since the above-described construction is unable to generate clamp force of sufficient magnitude, use of a force magnifying mechanism in the construction of a metalworking vise is already proposed. The construction disclosed in Japanese Patent Publication No. Sho. 63-41711 is one example, in which an oil pressure chamber is provided within a shaft coupled to a slide jaw and this shaft encases a piston slidable towards the oil pressure chamber. In clamping operation, the piston is screw driven to intrude into the oil chamber to raise its oil pressure and the slide jaw is moved forwards with a large force via application of oil pressure to the shaft end. Japanese Patent Laid-Open No. Sho. 61-95881 also proposes use of a force magnifying mechanism in construction of a metalworking vise.

In the case of these conventional proposals, however, the force magnifying mechanisms is located on the upstream side of the slide jaw along the clamping direction. Due to this location of the force magnifying mechanism, clamping operation of a workpiece poses a counter force, which is generated as a reaction of the clamp force, onto the rear end face of the fixed base. This counter force causes undesirable warping of the fixed base, which inevitably lowers precision in clamping position. In particular, use of a force magnifying mechanism generates a large counter force and, as a consequence, increased warping of the fixed base. In addition, it is necessary to arrange an additional member at the rear end of the fixed base to endure the increased counter force and presence of such an additional member naturally results in an increased size of the entire construction. Further presence of such an additional member at the rear end of the fixed base limits sliding ambit of the slide jaw and, accordingly, the size of workpieces to be worked on the vise.

SUMMARY OF THE INVENTION

It is the object of the present invention to generate a large clamp force with high precision in clamping position and a reduced space necessary for installation of a metalwork vise.

In accordance with the present invention, a stationary jaw is mounted to a fixed base, a holder shaft is mounted to this fixed base in an axially slidable arrangement, a slide jaw operationally coupled to the holder shaft is arranged facing the stationary jaw, the first hydraulic chamber is formed in the front end portion of the fixed base, a piston is encased in the holder shaft in an axially slidable arrangement towards the first hydraulic chamber, the piston is driven for forward movement by a drive unit, and the second hydraulic chamber is formed between the fixed base and a axial extension formed on the front end portion of the holder shaft in communication with the first hydraulic chamber.

DESCRIPTION OF THE PREFERRED EMBODIMENTS

Figure 1:
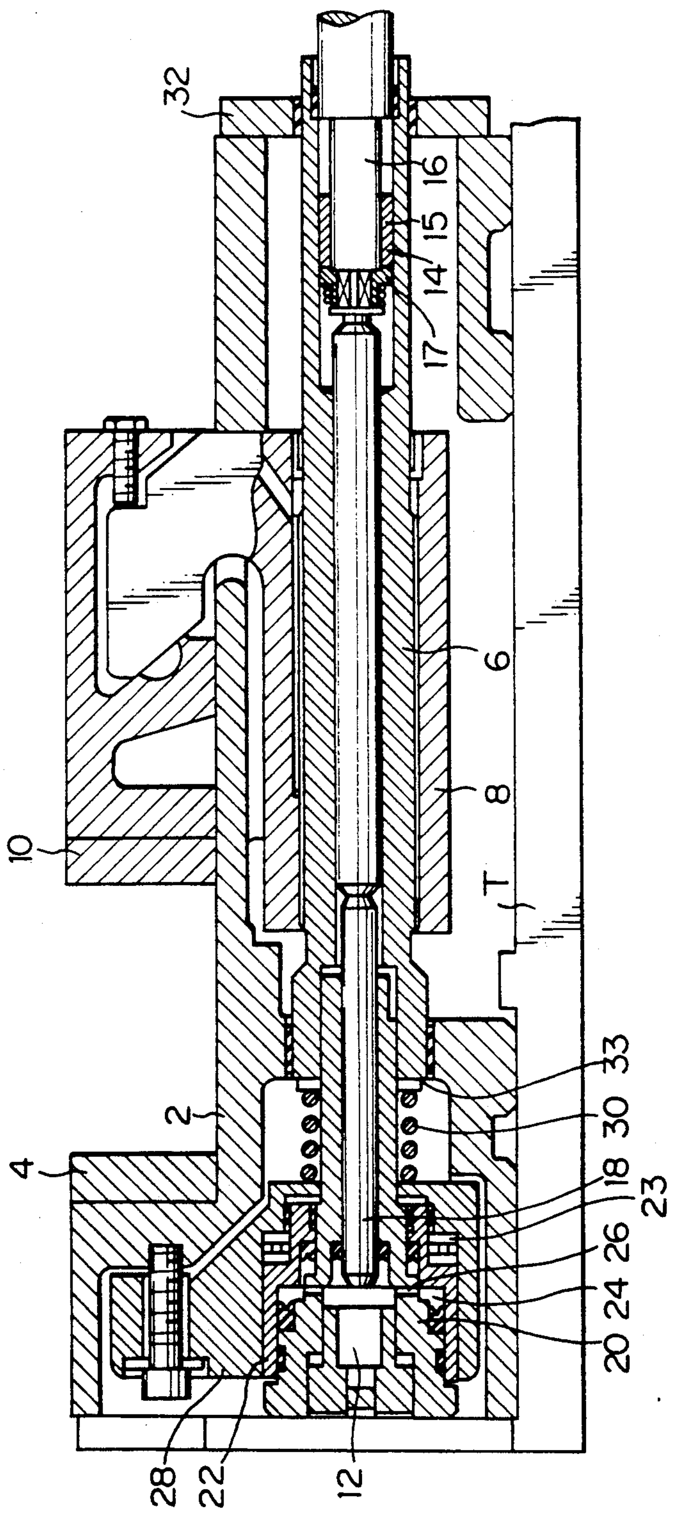
FIG. 1 is a sectional side view of the first embodiment of the vise in accordance with the present invention.

The first embodiment of the vise in accordance with the present invention is shown in FIG. 1, in which a fixed base 2 is mounted atop a machine table T and a horizontal and cylindrical holder shaft 6 is mounted to the fixed base 2 in an axially rotatable and axially slidable arrangement. This holder shaft 6 carries via screw engagement a nut 8 formed integrally with a slide jaw 10 arranged atop the fixed base 2. On rotation of the holder shaft 6, the nut 8 urges the slide jaw 10 for movement towards and away from a stationary jaw 4 also arranged atop the fixed base 2.

Within the front end portion of the fixed base 2 near the stationary jaw 4, the holder shaft 6 is coaxially provided at its front end with an axial extension 20 of a larger diameter. This axial extension has a cylindrical construction which defines the first hydraulic chamber 12. The holder shaft 6 encases a piston 18 in an axially slidable arrangement and the front end portion of the piston 18 projects into the first hydraulic chamber 12.

A sleeve 22 is concentrically inserted via a bearing 23 over the axial extension 20 and the annular second hydraulic chamber 24 concentric with the first hydraulic chamber 12 is defined between the axial extension 20 and the sleeve 22. The hydraulic chambers 12 and 24 are properly sealed fluid tight as shown with small black blocks in the illustration. The first and second hydraulic chambers 12 and 24 are connected to each other via a plurality of fluid conduits 26 formed through the axial extension 20 in the axial direction.

A block 28 is screw fixed to the front face of the stationary jaw 4 to restrict rearward moovement of the sleeve 22 via bearings 23. A compression coil spring 30 is interposed between the rear end face of the block 28 and an intermediate face 33 of the holder shaft 6 surrounding the other part of the holder shaft 6 for provision of preliminary pressure.

Near the rear end, the holder shaft 6 is internally provided with a clutch 14 which couples the holder shaft 6 to a main drive shaft 16 via a tubular member 15 fixed to the holder shaft 6. More specifically, the clutch 14 is made up of the tubular member 15, a drive disc 17 and a coil spring for maintaining the two elements in a pressure contact. The drive disc 17 is coupled to the main drive shaft 16 in an axially slidable arrangement but locked against relative rotation. In the plane of the pressure contact, a projection having an inclined face and a groove engageable therewith are formed on the respective elements, the main drive shaft 16 is placed in screw engagement with the tubular member 16. A support plate 32 is attached to the rear end face of the fixed base 2 in order to support the holder shaft 6 in position.

In operation, the holder shaft 6 compresses the second hydraulic chamber 24 due to repulsion of the coil spring 30 acting on its intermediate face 33 to raise the oil pressure within the first hydraulic chamber 12 in communication with the second hydraulic chamber 24. The holder shaft 6 stops at a position whereat the oil pressure from the second hydraulic chamber 24 and the spring repulsion balances.

On rotation of the main drive shaft 16, the holder shaft 6 is also driven for concurrent rotation via the clutch 14. Rotation of the holder shaft 6 causes concurrent rotation of the sleeve 22 on the axial extension 20. Rotation of the holder shaft 6 further urges, via the nut 8, the slide jaw 10 to move towards a workpiece not shown in the drawing.

As the slide jaw 10 starts to clamp the workpiece and the torque acting on the clutch 14 exceeds the limit defined by the spring 30, the clutch 14 starts to slide and the holder shaft 6 ceases its rotation. As a result, the threaded section of the main drive shaft 16 comes into screw engagement with the tubular member 15 and the main drive shaft 16 moves forwards while rotating.

This forward movement of the drive shaft 16 advances the piston 18 in the holder shaft 6 into the first hydraulic chamber 12 and the fluid pressure within the first hydraulic chamber rises. Concurrently, fluid flows from the first hydraulic chamber 12 into the second hydraulic chamber 24 via the fluid conduits 26 to raise the fluid pressure within the second hydraulic chamber 24.

The increased fluid pressure in the second hydraulic chamber 24 acts on the rear end face of the axial extension 20 of the holder shaft 6 and, as a result, the balance with the coil spring 30 is lost, the slide jaw 10 is pulled forwards via the holder shaft 6 to initiate the hand clamping operation. At this moment, a counter force of the fluid pressure on the axial extension 20 acts on the rear face of the stationary jaw 4 and the lower front end face of the fixed base 2 via the front end face of the sleeve 22, the bearing 23 and the block 28.

As a consequence, the force acting on the workpiece from the slide jaw 10 is magnified by a value equal to a product of the fluid pressure with the surface area of the rear end face of the axial extension 20 in the second hydraulic chamber 24. In other words, the clamp force is magnified by operation of the force magnifying mechanism in accordance with the present invention. Because the counter force acts on the front end face of the fixed base 2 near the position of the stationary jaw 4, no undesirable warping of the fixed base 2 is encountered here. In addition, because the rear face of the stationary jaw 4 is pushed via the block 28, no strain of the stationary jaw 4 is caused even when the clamp force is magnified as stated above.

Repeated use of the system over a long period may induce leakage of the fluid in the hydraulic chambers 12 and 24. In the case of the present invention, however, reduction in amount of the operating fluid due to leakage would change the initial position of the holder shaft 6. That is, the holder shaft 6 moves rearwards until the spring force balances the reduced fluid pressure. As a result, there is no substantial malign influence by reduction in amount of the operating fluid due to leakage.

As stated already, the support plate 32 is attached to the rear end face of the fixed base 2 just in order to support the holder shaft 6 in position. When the support plate 32 is removed, slide jaw 10 may partly project outside the rear end face of the fixed base 2 at its rearmost position. This arrangement may enlarge the moving ambit of the slide jaw 10.

Figure 2:
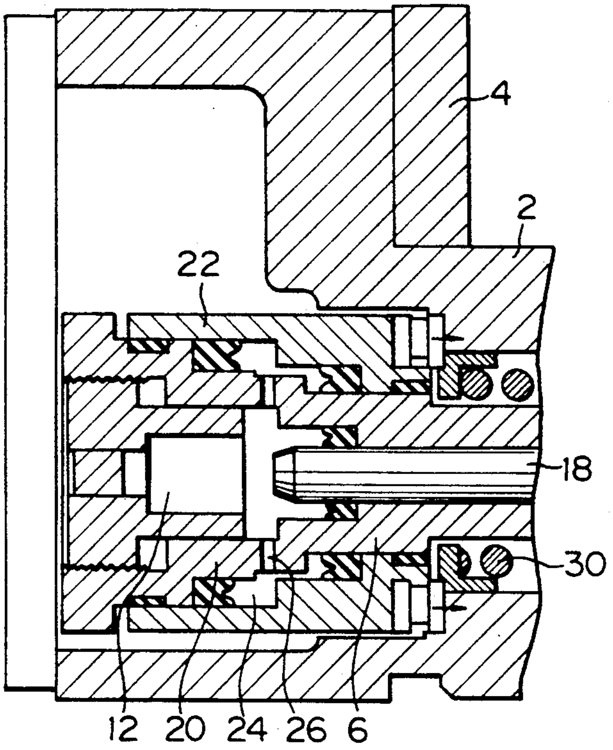
FIGS. 2 to 6 are sectional side views of the main parts of its modifications.

One modification of the arrangement of FIG. 1 is shown in FIG. 2 in which the block 28 is removed so that the counter force acts not only on the rear face of the stationary jaw 4 but also directly on the fixed base 2 via the bearing. The other parts are same in construction and operation as those in FIG. 1.

Figure 3:
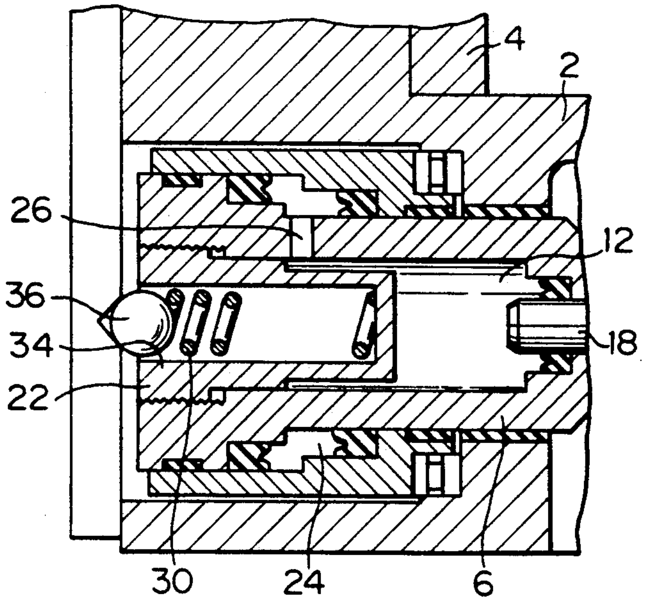

In the arrangement shown in FIG. 3, the compression coil spring 30 is arranged within the holder shaft 6. More specifically, a spring case 34 is inserted form forward into the first hydraulic chamber 12 to accommodate the coil spring 30 therein. A lock ball 36 is attached to the front opening of the spring case 34 to receive the front end of the coil spring 30.

Figure 4:
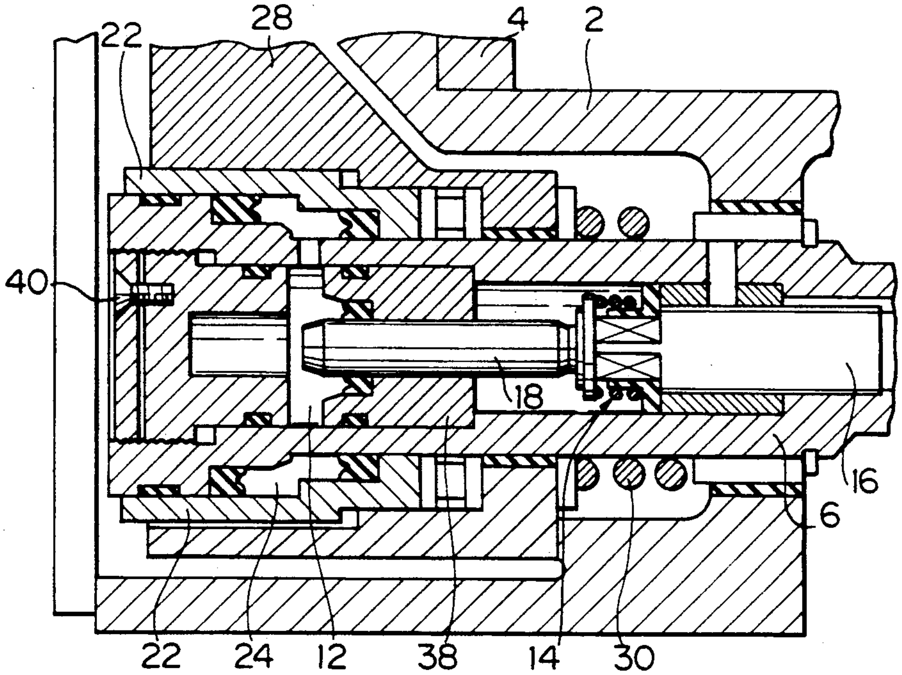

FIG. 4 depicts the other modification of the construction shown in FIG. 1, in which the clutch is arranged in the front end portion of the holder shaft 6. More specifically, a support tube 38 is arranged via a seal within the first hydraulic chamber 12 to support the piston 18 and the main drive shaft 16 is arranged on the rear side thereof via the clutch 14. A set screw 40 is screwed into the front face of the holder shaft 6 in order to lock the holder shaft 6. The other parts are same as those in FIG. 1.

Figure 5:
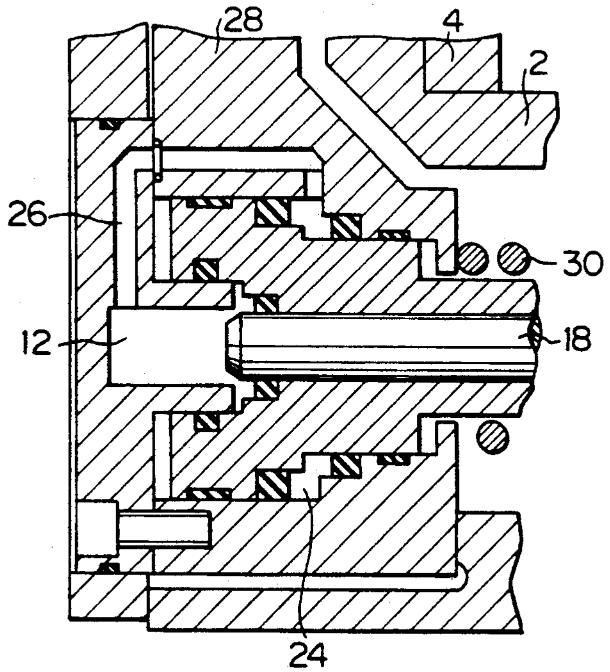

In the case of the first embodiment shown in FIG. 1, the fluid conduits 26 connecting the hydraulic chambers 12 and 24 are formed radilly in the holder shaft 6. As an alternative, the same may be formed in the fixed base 2 as shown in FIG. 5. More specifically, each fluid conduit 26 extends, in the fixed base 2, radially outwards from the first hydraulic chamber 12, axially rearwards and radially inwards to the second hydraulic chamber 24. In this case, the first hydraulic chamber 12 is defined by the holder shaft 6 and the block 28.

Figure 6:
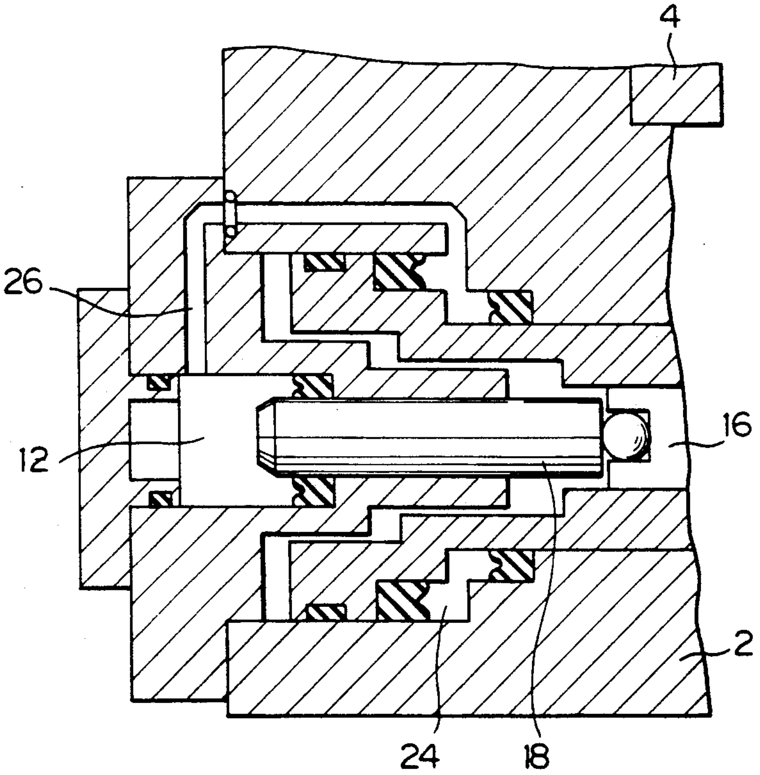

In the construction shown in FIG. 6, the piston 18 is supported not by the holder shaft 6 but by the fixed base 2. In this case, the first hydraulic chamber 12 is defined by the fixed base 2 only.

Figure 7:
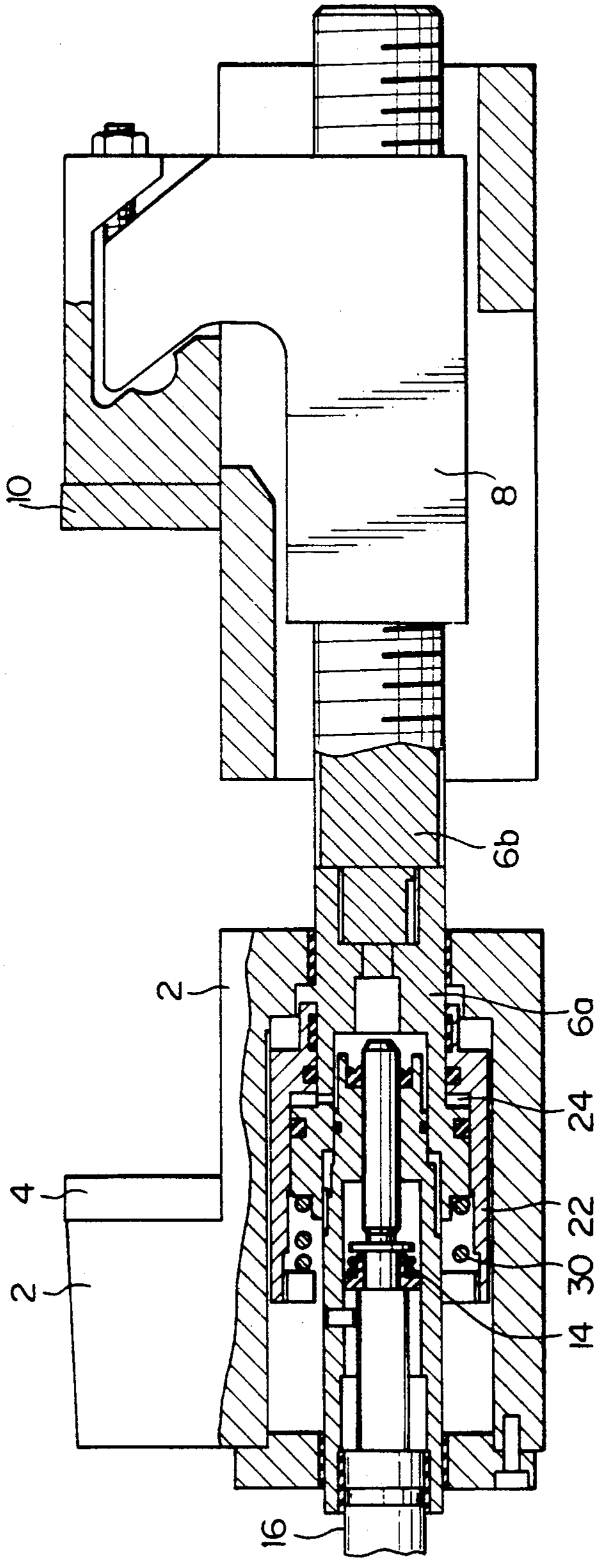
FIG. 7 is a sectional side view of the second embodiment of the vise in accordance with the present invention.

FIG. 7 depicts the second embodiment of the vise in accordance with the present invention which is advantageously used for clamping a workpiece of a large size. In this case, the fixed base 2 is divided into a front section on the side of the stationary jaw 4 and a rear section on the side of the slide jaw 10. The holder shaft 6 is also made up of a front shaft section *6a* on the side of the stationary jaw 4 and a rear shaft section *6b* on the side of the slide jaw 10 and the two shaft sections *6a* and *6b* are detachably coupled to each other at their mating ends. The slide jaw side shaft section *6b* is replaceable depending on the size of the workpiece to be clamped. The drive unit for the piston 18 is arranged on the side of the stationary jaw 4. Since no support plate 32 is used in this embodiment, the slide jaw 10 has an increased ambit for its movement.

Figure 8:
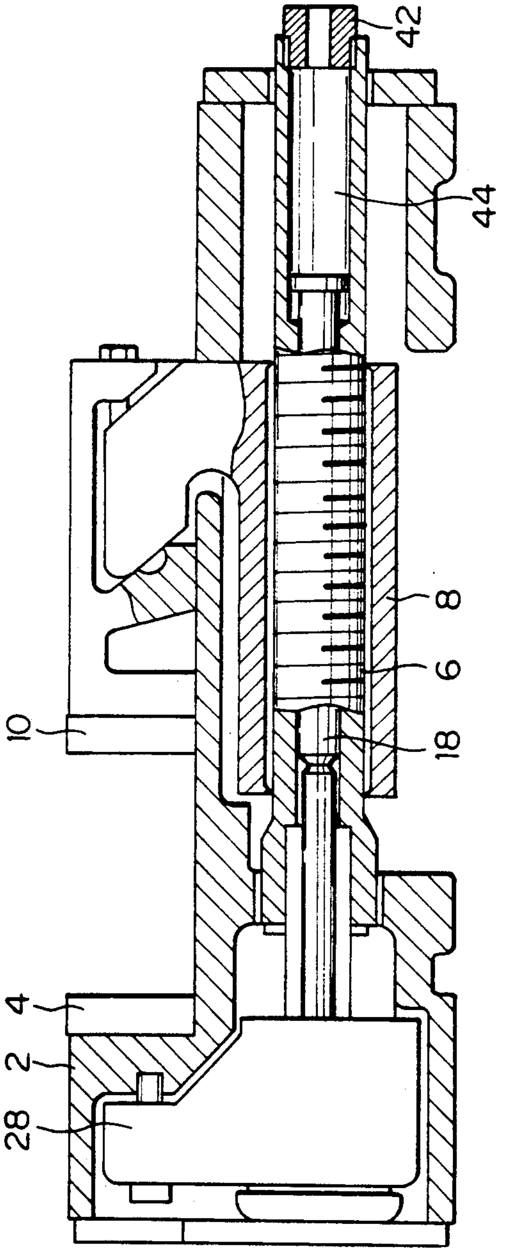
FIGS. 8 to 12 are sectional side views of other embodiments of the vise in accordance with the present invention.

In the construction shown in FIG. 8, a pneumatic system is used for the drive unit for the piston. More specifically, an air cylinder 44 is formed within the rear end portion of the holder shaft 6 and its rear end is accompanied with a coupler 42. So that pneumatic supply should not be disturbed by rotation of the holder shaft 6, a rotary type coupler is preferably used. At assembly, the holder shaft 6 is first rotated until the slide jaw 10 softly clamps the workpiece and compressed air is next introduced into the air cylinder 44 to advance the piston 18 into the first hydraulic chamber 12.

Figure 9:
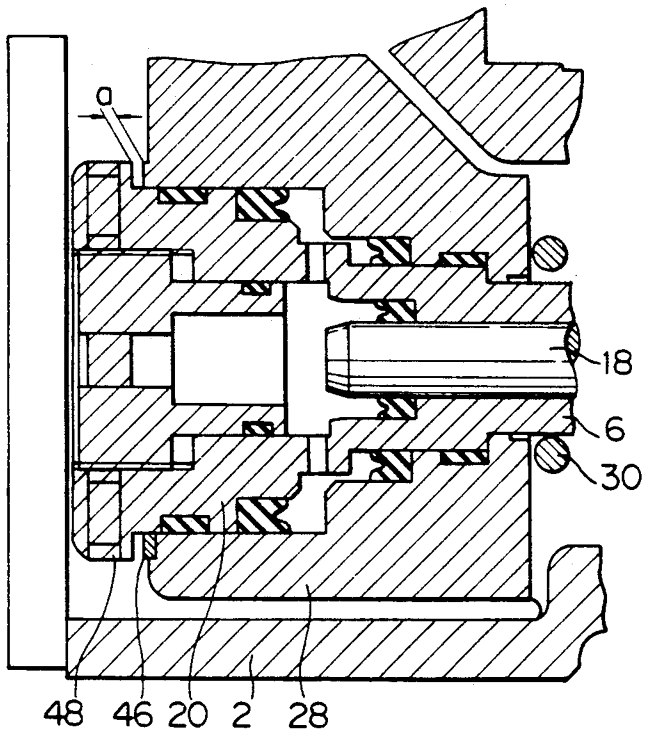
Figure 11:
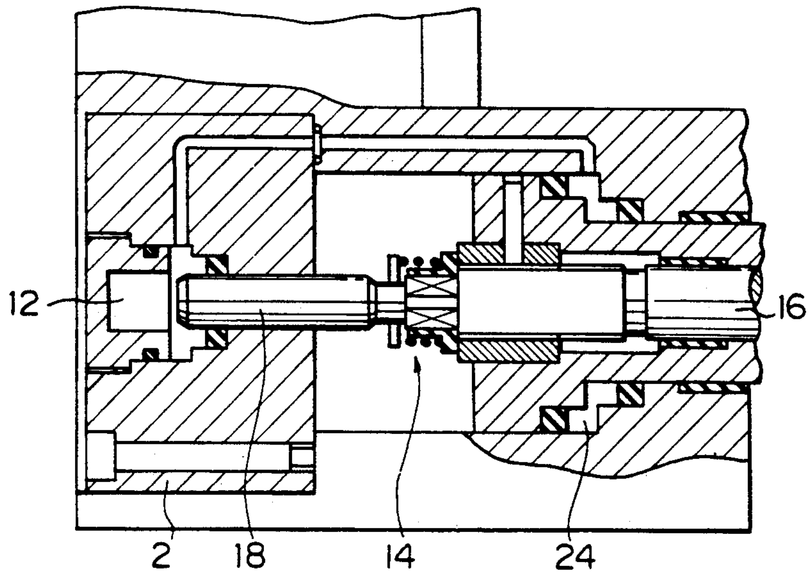

The embodiment shown in FIG. 9 is provided with a fluid leakage detecting system. More specifically, a piezoelectric element 46 is attached to the front end face of the block 28 and a projection 48 is formed on the axial extension 20 facing the piezoelectric element 46 on the block 28. As the amount of the fluid decreased due to leakage, the initial position of the holder shaft 6 shifts rearwards and the gap shown with "a" in the illustration decreases gradually. When the fluid leakage exceeds a certain level, the piezoelectric element 46 on the block 28 comes into contact with the projection 46 on the axial extension 20 of the holder shaft 6 and an alarm is automatically issued to announce presence of intolerable fluid leakage.

The piezoelectric element 46 may be replaced by a proper limit switch. Further, detection of intolerable fluid leakage can be performed even without use of such a piezoelectric element when the second hydraulic chamber 24 is formed in the fixed base 2. That is, the projection on the axial extension 20 abuts against the fixed base 2 and a corresponding load acts on the holder shaft 6. Then, when the holder shaft 6 is manually rotated, an operator feels an increased resistance on his hand as a signal that fluid has leaked from the hydraulic chamber. When a colour mark is formed in axial extension on the rear end portion of the holder shaft 6 near the rear end of the fixed base 2, shift in initial position of the holder shaft 6 caused by fluid leakage can be detected via change in exposed length of the colour mark.

Figure 10:
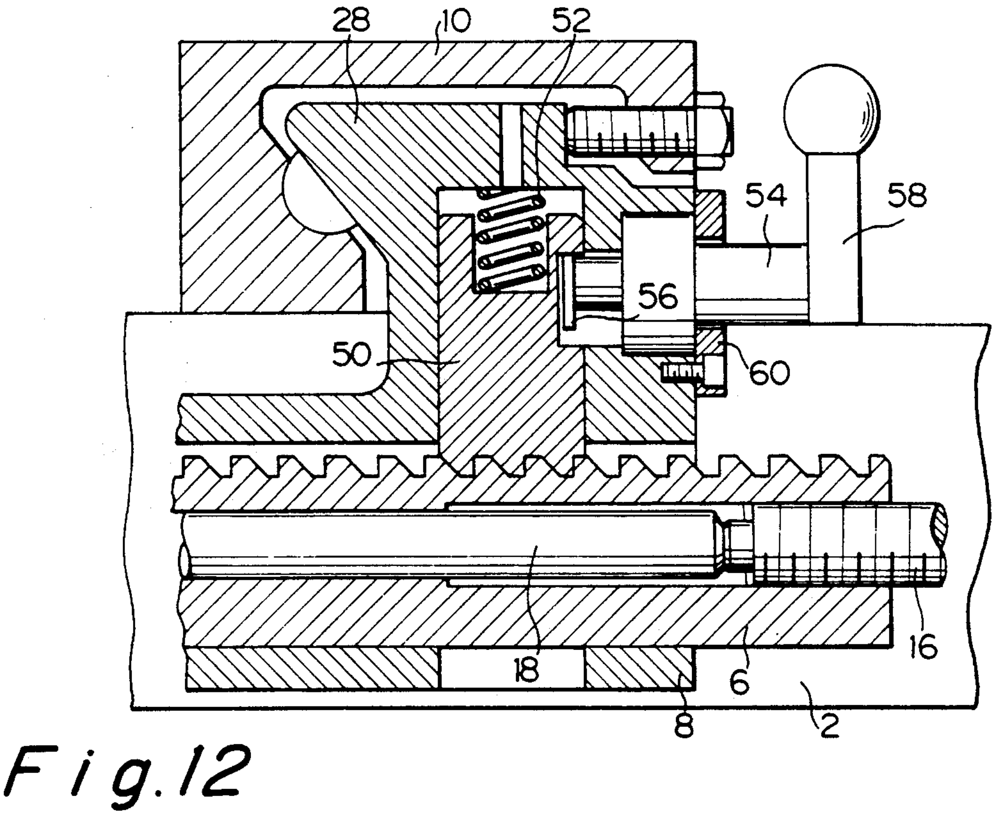

In the case of the embodiment shown in FIG. 10, no separate clutch is used for the drive unit for the piston 18 and a rack is formed on the top face of the holder shaft 6. In the area of this rack, a vertical bore is formed in the nut 8 opening downwards and a slide piece 50 is inserted into this bore in meshing engagement at its lower end with the rack on the holder shaft 6. This meshing engagement is maintained by repulsion of a compression spring 52 interposed between the top face of the slide piece 50 and the nut 8. A radial bore is formed in the nut 8 in communication with the vertical bore and a shaft 54 is rotatably inserted into the radial bore. This shaft 54 is provided at its inner end with an eccentric piece 56 and at its outer end with a lever 58 for manual operation. The slide piece 50 is provided on its periphery with a depression for engagement with the point of the eccentric piece 56. The shaft 54 is maintained in the radial bore by means of a fastener plate 60.

When the lever 58 is kept at the illustrated position, the slide piece 50 is kept in the meshing engagement with the rack on the holder shaft 6 due to repulsion by the compression spring 52 and the holder shaft 6 is kept in operational coupling with the slide jaw 10. As the lever 58 is turned sideways, corresponding change in position of the eccentric piece 56 lifts the slide piece 50 out of the meshing engagement with the rack on the holder shaft 6 to free the holder shaft 6 out of the operational coupling with the slide jaw 10. For clamping operation, the slide jaw 10 is manually advanced towards the workpiece. Preceding disengagement of the slide piece 50 from the rack on the holder shaft 6 allows this movement of the slide jaw 10 with the nut 8. Next the main drive shaft 16 is rotated to advance the piston 18 into the first hydraulic chamber 12.

Figure 12:
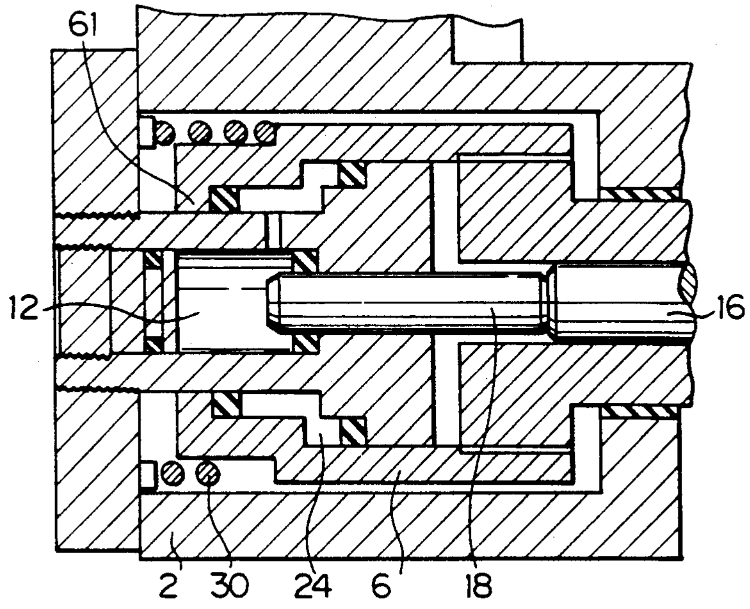

In the construction shown in FIG. 12, the front end of the fixed base 2 is has a central rear extension received in the holder shaft 6 to define the first hydraulic chamber 12. As a substitute for the large diametral section 20, the front end of the holder shaft 6 is provided with a cylindrical, small diametral section 61 so that the second hydraulic chamber 24 should be formed between the rear extension of the fixed base 2 and the small diametral section 61 of the holder shaft 6.

In the case of the foregoing embodiments, oil pressure in the hydraulic chambers are raised by axial movement of the piston 18. Such a rise in oil pressure can be also attained by using a piston which extends through the fixed base 2 in direct communication with the hydraulic chambers.

In accordance with the present invention, members composing the hydraulic chambers in the vicinity of the stationary jaw 4 and the projection formed at the front end of the holder shaft 6 has a cylinder-piston relationship. The oil pressure in the hydraulic chambers are raised at the time of clamping so that the raised oil pressure pulls the slide jaw 10 with a magnified force towards the stationary jaw 4. The magnified counter force at clamping acts on the section of the fixed base 2 near the stationary jaw 4. As a consequence, the counter force generated during clamping operation acts on the fixed base near the stationary jaw so that no substantial warping of the fixed base is encountered. A large clamp force can be therefore generated without degrading precision in clamping position.

Since the drive unit for the piston is located within the fixed base near the stationary jaw, at least a part of the drive unit overlaps the stationary jaw in length, thereby reducing the size of the entire vise construction. In addition, the rear end portion of the slide jaw is allowed to project from the rear end of the fixed base as long as it is reliably guided by the fixed base, thereby increasing the moving ambit of the slide jaw, the size of the workpiece to be clamped.

I claim:

1. A metalworking vise comprising a fixed base; a stationary jaw mounted on said fixed base; a holder shaft having a front end and a rear end slidably mounted to said fixed base for slidable movement along said fixed base in a predetermined axial direction, said front end of said holder shaft having an extension defining a first hydraulic chamber therein; a slidable jaw coupled to said holder shaft for axial movement therewith relative to said stationary jaw; sleeve means surrounding said extension at said front end of said holder shaft, said extension and said sleeve means defining a second hydraulic chamber therebetween, said first and second hydraulic chambers being in fluid communication with each other; and piston means being mounted in said holder shaft for axial movement therein, said piston means having a front end and a rear end, said rear end being adaptable to be coupled to a manual drive unit, and said front end being moveable into said first hydraulic chamber.

2. A metalworking vise as claimed in claim 1 including coupling means for coupling said sleeve means to said holder shaft.

3. A metalworking vise as claimed in claim 2 wherein said coupling means comprises a bearing.

4. A metalworking vise as claimed in claim 1 including urging means for urging said holder shaft in a direction toward said rear end of said holder shaft.

5. A metalworking vise as claimed in claim 4 wherein said urging means comprises spring means.

6. A metalworking vise as claimed in claim 1 wherein said holder shaft has a first diameter, and wherein said extension of said holder shaft has a second diameter, said second diameter being larger than said first diameter.

7. A metalworking vise as claimed in claim 1 including a predetermined gap between said extension at said front end of said holder shaft and said fixed base, and including electrical sensor means for electrically detecting a reduction in said predetermined gap.

8. A metalworking vise as claimed in claim 1 including indicia means at said rear end of said holder shaft for detecting fluid leakage from one of said hydraulic chambers.

9. A metalworking vice comprising a fixed base having a front end and a rear end, said front end including a front section defining a first hydraulic chamber therein; a stationary jaw mounted on said fixed base; a holder shaft having a front end and a rear end slidably mounted to said fixed base for slidable movement along said fixed base in a predetermined axial direction, said front end of said holder shaft having an extension thereon; a slidable jaw coupled to said holder shaft for axial movement therewith relative to said stationary jaw; block means surrounding said extension at said front end of said holder shaft, said extension and said block means defining a second hydraulic chamber therebetween, said first and second hydraulic chambers being in fluid communication with each other; and piston means mounted in said holder shaft for axial movement therein, said piston means having a front end and a rear end, said rear end being adaptable to be coupled to a manual drive unit, and said front end being movable into said first hydraulic chamber when a predetermined load is exerted on said rear end.

10. A metalworking vise as claimed in claim 9 further comprising sleeve means, said sleeve means surrounding said extension at said front end of said holder shaft and being coupled to said extension at said front end of said holder shaft.

11. A metalworking vise as claimed in claim 9 wherein said holder shaft has a first diameter, and wherein said extension of said holder shaft has a second diameter, said second diameter being larger than said first diameter.

12. A metalworking vise comprising a fixed base having a front end and a rear end, said front end including a front section defining a first hydraulic chamber therein; a stationary jaw mounted on said fixed base; a holder shaft slidably mounted to said fixed base for slidable movement along said fixed base in a predetermined axial direction, said front end of said holder shaft having a cylindrical section, said cylindrical section and said front end of said fixed base defining a second hydraulic chamber therebetween, said first and second hydraulic chambers being in fluid communication with each other; a slidable jaw coupled to said holder shaft for axial movement therewith relative to said stationary jaw; and piston means being mounted in said holder shaft for axial movement therein, said piston means having a front end and a rear end, said rear end being adaptable to be coupled to a manual drive unit, and said front end being movable into said first hydraulic chamber when a predetermined load is exerted on said rear end.

13. A metalworking vise as claimed in claim 12 including urging means for urging said holder shaft in a direction toward said rear end of said holder shaft.

14. A metalworking vise as claimed in claim 13 wherein said urging means comprises spring means.

15. A metalworking vise as claimed in claim 12 including a predetermined gap between said extension at said front end of said holder shaft and said fixed base, and including electrical sensor means for electrically detecting a reduction in said predetermined gap.

* * * * *